US009544532B2

(12) United States Patent
Nichols et al.

(10) Patent No.: US 9,544,532 B2
(45) Date of Patent: Jan. 10, 2017

(54) SYSTEM AND METHOD FOR PRE-RECORDING VIDEO

(71) Applicant: SMUGMUG, INC., Mountain View, CA (US)

(72) Inventors: Samuel Nichols, Mountain View, CA (US); Don MacAskill, Los Altos, CA (US)

(73) Assignee: SmugMug, Inc., Mountain View, CA (US)

( * ) Notice: Subject to any disclaimer, the term of this patent is extended or adjusted under 35 U.S.C. 154(b) by 0 days.

(21) Appl. No.: 14/423,213

(22) PCT Filed: Aug. 22, 2013

(86) PCT No.: PCT/US2013/056147
§ 371 (c)(1),
(2) Date: Feb. 23, 2015

(87) PCT Pub. No.: WO2014/031834
PCT Pub. Date: Feb. 27, 2014

(65) Prior Publication Data
US 2015/0264294 A1 Sep. 17, 2015

Related U.S. Application Data
(60) Provisional application No. 61/692,563, filed on Aug. 23, 2012.

(51) Int. Cl.
H04N 5/76 (2006.01)
H04N 5/911 (2006.01)
(Continued)

(52) U.S. Cl.
CPC .............. *H04N 5/911* (2013.01); *H04N 5/232* (2013.01); *H04N 5/919* (2013.01)

(58) Field of Classification Search
CPC ........ H04N 5/232; H04N 5/919; H04N 5/911; H04N 5/85; H04N 9/8042; G11B 27/105; G11B 2220/2562; G11B 27/329; G11B 27/034; G11B 2220/90; G11B 27/34
(Continued)

(56) References Cited

U.S. PATENT DOCUMENTS
2002/0196348 A1 12/2002 Kubo
2003/0189647 A1 10/2003 Kang
(Continued)

FOREIGN PATENT DOCUMENTS
EP 1874041 A1 1/2008

OTHER PUBLICATIONS
International Search Report and Written Opinion, PCT/US2013/056147, Oct. 10, 2013.

Primary Examiner — William Tran
(74) Attorney, Agent, or Firm — Patterson & Sheridan, LLP

(57) ABSTRACT

Embodiments of the invention generally relate to methods and apparatus for pre-recording digital video. The method includes pre-recording video data prior to initiation of a record command from a user. After initiation of a record command from the user, recorded video data is captured. The pre-recorded video data and the recorded video data are optionally appended or combined into a single file. The apparatus includes a non-transitory computer readable containing instructions for pre-recording video.

20 Claims, 4 Drawing Sheets

(51) Int. Cl.
*H04N 5/232* (2006.01)
*H04N 5/919* (2006.01)

(58) Field of Classification Search
USPC .......................................... 386/278
See application file for complete search history.

(56) References Cited

U.S. PATENT DOCUMENTS

| | | | |
|---|---|---|---|
| 2006/0132636 A1* | 6/2006 | Miyata | H04N 5/232 |
| | | | 348/333.01 |
| 2008/0129854 A1 | 6/2008 | Onoda et al. | |
| 2008/0183843 A1* | 7/2008 | Gavin | G06Q 30/06 |
| | | | 709/217 |
| 2010/0309335 A1 | 12/2010 | Brunner et al. | |
| 2012/0075464 A1* | 3/2012 | Derenne | A61B 5/0013 |
| | | | 348/135 |
| 2012/0189283 A1* | 7/2012 | Shintani | H04N 5/772 |
| | | | 386/278 |

* cited by examiner

SYSTEM AND METHOD FOR PRE-RECORDING VIDEO

BACKGROUND OF THE INVENTION

Field of the Invention

Embodiments of the invention generally relate to recording digital videos.

Description of the Related Art

The recording of digital video is becoming increasingly more popular, particularly as more and more devices, such as digital cameras and smart phones, have the ability to record digital videos. The recording of digital videos, for example on smart phones, is accomplished using a software application.

To record digital video using a smart phone, a user generally selects a "record" command in the software application on the smart phone. However, selecting the "record" command can be time consuming. For example, smart phones often need to be unlocked by entering an access code, then an application needs to be opened, and then menus may need to be traversed to reveal the record instruction or command, such as a "record" button. During the time required for the user to select the record command, the event which is desired to be recorded could have already occurred and the user could have missed his or her opportunity to capture the video.

Therefore, there is a need for a system and method of capturing video prior to initiating a record command.

SUMMARY OF THE INVENTION

Embodiments of the invention generally relate to methods and apparatus for pre-recording digital video. The method includes pre-recording video data prior to initiation of a record command from a user. After initiation of a record command from the user, recorded video data is captured. The pre-recorded video data and the recorded video data are optionally appended or combined into a single file. The apparatus includes a non-transitory computer readable containing instructions for pre-recording video.

In one embodiment, a method for pre-recording video comprises recording a first time interval of video and saving the first time interval of video to a data storage. While recording the first time interval of video, an instruction to record a video is received. In response to receiving the instruction, a second time interval of video is recorded and saved to the data storage.

In another embodiment, a non-transitory computer readable medium comprises a sequence of instructions for pre-recording a video. Execution of the sequence of instructions by a processing unit of a system causes the system to record a first time interval of video and save the first time interval of video to a data storage. While recording the first time interval of video, the system receives an instruction to record a video. In response to receiving the instruction, the system records a second time interval of video and saves the second time interval of video to the data storage.

In another embodiment, a system comprises a camera, a processing unit, and a non-transitory computer readable medium. The non-transitory computer readable medium has thereon a sequence of instructions for pre-recording a video, which when executed by the processing unit causes the system to record a first time interval of video and save the first time interval of video, and while recording the first time interval of video, receive an instruction to record a video. In response to receiving the instruction, a second time interval of video is recorded and saved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the invention generally relate to methods and apparatus for pre-recording digital video. The method includes pre-recording video data prior to initiation of a record command from a user. After initiation of a record command from the user, recorded video data is captured. The pre-recorded video data and the recorded video data are optionally appended or combined into a single file. The apparatus includes a non-transitory computer readable containing instructions for pre-recording video.

Figure 1:
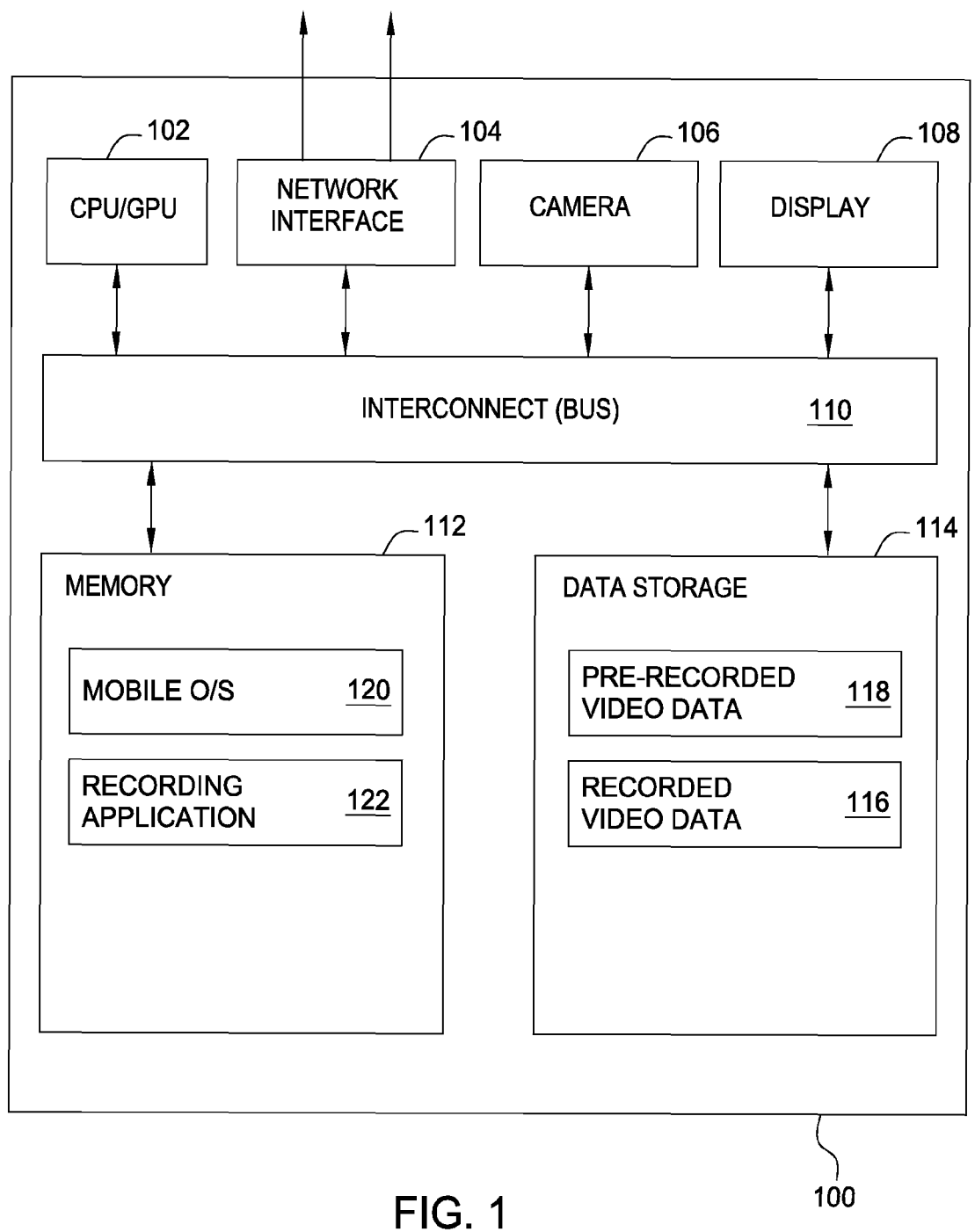
FIG. 1 is an example of a system according to one embodiment of the invention.

FIG. 1 is an example of a system 100 according to one embodiment of the invention. The system 100 may be, for example, a handheld telephone such as a smart phone. Of course, embodiments of the invention may be adapted for sure with a variety of computing devices, including personal data assistants (PDAs), tablet computers, digital cameras, and other computing devices adapted to record digital video.

As shown, the system 100 includes, without limitation, a central processing unit and/or graphics processing unit (CPU/GPU) 102, network interfaces 104, an interconnect 110, a memory 112, and a data storage 114. In addition, the system 100 also includes a display 108, such as a touch sensitive display, and a camera 106. The system 100 may also include other hardware components such as a magnetometer and an accelerometer (not shown).

The CPU/GPU 102 retrieves and executes programming instructions stored in the memory 112. Similarly, the CPU/GPU 102 stores and retrieves application data residing in the memory 112. The interconnect 110 is used to transmit programming instructions and application data between the CPU/GPU 102, the data storage 114, the network interface 104, and the memory 112. The CPU/GPU 102 is included to be representative of a single CPU, multiple CPUs, a single CPU having multiple processing cores, and the like. The memory 112 is generally included to be representative of a random access memory. The data storage 114, such as a hard disk drive or flash memory storage drive, may store non-volatile data. The camera 106 may provide a CCD device configured to capture still-images and video. The video and data captured by the camera 106 may be stored in data storage 114, for example, as recorded data 116 or pre-recorded video data 118.

Illustratively, the memory 112 includes a mobile operating system (O/S) 120 and a video recording application 122. The mobile O/S 120 provides software configured to control the execution of application programs, such as the video recording application 122, on the system 100. The video recording application 122 may be configured to capture videos via the camera 106, and store the videos and/or data to the data storage 114.

It will be appreciated that the system 100 shown herein is illustrative and that variations and modifications are possible. The connection topology, including the number and arrangement of bridges, may be modified as desired. For instance, in some embodiments, the memory 112 may be connected to the CPU/GPU 102 directly rather than through a bridge. Additionally, any number of add-in cards or peripheral devices might be supported.

Figure 2:
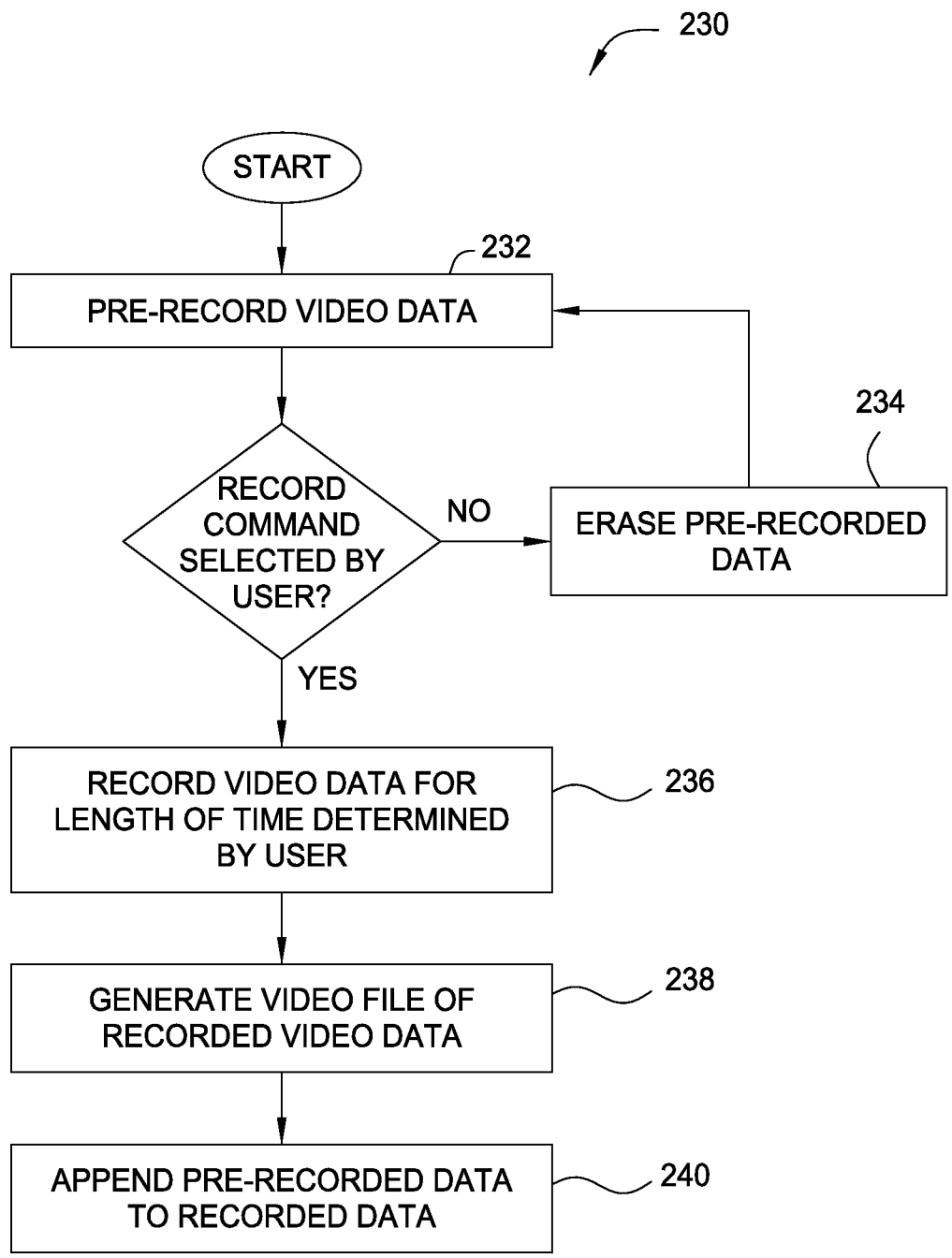
FIG. 2 is a flow diagram illustrating a method of pre-recording video data according to one embodiment of the invention.

FIG. 2 is a flow diagram 230 illustrating a method of pre-recording video data according to one embodiment of the invention. Flow diagram 230 begins at operation 232, in which pre-recorded video data is captured. Pre-recorded video data is data (such as video images) acquired by a camera prior to receiving a "record" command via user input (e.g., clicking a "record" button on a graphical user interface). The capturing of pre-recorded video data is facilitated by a software application, such as the recording application 122 shown in FIG. 1. The software application may be configured to capture an interval of video data, for example, five seconds, ten seconds, or one minute, continuously without a user having to select a record command via a graphical user interface. The ability of the software application to capture pre-recorded video data may be toggled on our off via a selection menu within the software application. Once the ability of the software to capture pre-recorded video is toggled on, pre-recorded video is captured without any additional action or instruction from a user. Thus, pre-recorded video data is captured without a user selecting a record command such as a record button. It is contemplated that a user may desire to adjust certain settings within the software application, such as the length of time of the pre-recording or the quality of the pre-recording. The pre-recorded video data captured in operation 232 is stored in a data storage.

If a user has not selected a record command in the software application (e.g., instructed the system to record video via the camera) within the time interval of the video pre-recording, the process proceeds to operation 234. In operation 234, the pre-recorded data is erased or the data storage space is made available for overwrite to conserve memory space. Put otherwise, if a user has not selected a record command within the time interval of the pre-record, the pre-recorded video data is discarded. In one example, pre-recorded video may be captured in five second intervals. If at the end of a five second interval a user has not yet selected a record command within the software application, the data storage space utilized to save the five second interval of pre-recorded data is made available to be overwritten, for example, by a subsequent five second interval of prerecorded data. Thus, the amount of data storage space utilized by the pre-recorded data is minimized. It is to be understood that while the example is described as five second intervals, other time periods are possible and may either be preselected by the user or selected and set by the manufacturer.

In another example, the pre-recorded data may be captured in a "rolling" manner. In a rolling pre-recording, the pre-recorded data is both continuously recorded and continuously made available for overwrite. For example, when the software application is set to capture pre-recorded video data in five second intervals, a first five second interval of pre-recorded video data may be captured. As the camera captures a sixth second of pre-recorded data, the first second of the first five second interval of captured video data is made available for overwrite. Thus, while new pre-recorded video data is captured, an equal interval (either in time or size) of the oldest pre-recorded video is made available for overwrite, thus maintaining a file of pre-recorded video data equal in size/time to a predetermined interval (e.g., five seconds). It is contemplated that a memory and memory pointer may be utilized to facilitate the rolling recording of pre-recorded video.

If a user has selected a record command within the software application within the time interval of captured pre-recorded video data, the pre-recorded video data is saved to a data storage in operation 236 and overwriting of the pre-recorded video data ceases. In addition, recorded video data (e.g., video data captured subsequent to the user-selected record command) is also captured. The length of the recorded video data is determined by a user, for example, by initiating a "stop recording" command, or by the software application's maximum file size limit. The recorded data may be saved as a separate file distinct from the pre-recorded video data.

In operation 238, the recorded video data is utilized to generate a video file in a predetermined video format, such as .mp4, and is saved to the data storage. It is contemplated that the recorded video data may be saved to the data storage in another format, such as RAW. Thus, subsequent to operation 238, the data storage contains a pre-recorded video data file and a recorded video data file.

In operation 240, the pre-recorded data file is optionally appended to the recorded data file. Thus, the recorded data file would include video which was recorded prior to the initiation of a recording command by the user. In one example, the recorded video would include five additional seconds of pre-recorded video appended to the beginning of the recorded video. The pre-recorded video data, or a portion thereof, may be optionally appended to the recorded video data by a user through a menu of the software application, such as an Edit menu. The pre-recorded video may be added to the recorded video by scrubbing backwards to a desired mark, for example, the negative five second mark of the recorded video.

FIG. 2 illustrates one embodiment for capturing pre-recorded video data; however, additional embodiments are also contemplated. In another embodiment, it is contemplated that a second pre-recorded video file may be captured simultaneously with a first pre-recorded video file in operation 232. The first pre-recorded video file may be a five or ten second video file captured in the same format as a recorded video file (captured in operation 236), while the second pre-recorded video file may be a longer pre-recorded video, such as one minute, in the same or different video format, such as RAW. In such an embodiment, the shorter pre-recorded video file simplifies appending the pre-recorded video to the recorded video, while the second pre-recorded video increases the amount of time for pre-recording.

In another embodiment, it is contemplated that the pre-recorded video may be appended to the recorded video without user input. For example, selection of the recording command by a user could continue the recording of the pre-recording video data and extend the recording into the recorded video data. Thus, the recorded video data would be a continuation of the pre-recorded video data, and the pre-recorded video data and the recorded video data would be saved as a single file. In such an embodiment, operation 240 may be excluded since the pre-recorded video and the recorded video are already appended or combined. The user may scrub undesired video frames from the appended video file using a feature in the Edit menu. In yet another embodiment, it is contemplated that operations 236 and 238 may be combined into a single operation. When the pre-recorded video data and the recorded video data are a single file, the time when the recorded video begins is noted. In other words, when recording both pre-recorded video and recorded video, the video may be recorded to one file and when the user presses the record button on a recording device and a notation of the time at which the user hits the record button is made. After the user has finished recording, the start of the video begins with the pre-recorded video that is a predefined period of time before the noted time (i.e., prior to the time the user hit record). The entire video, both pre-recorded and recorded, are saved as one file.

Figure 3A:
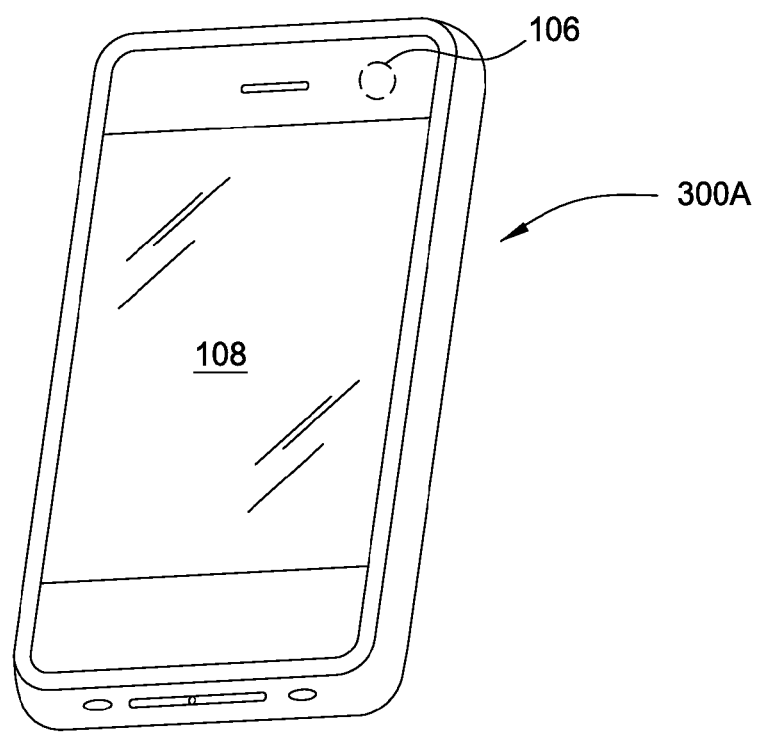
FIGS. 3A-3C illustrate exemplary systems for practicing embodiments of the invention.
Figure 3B:
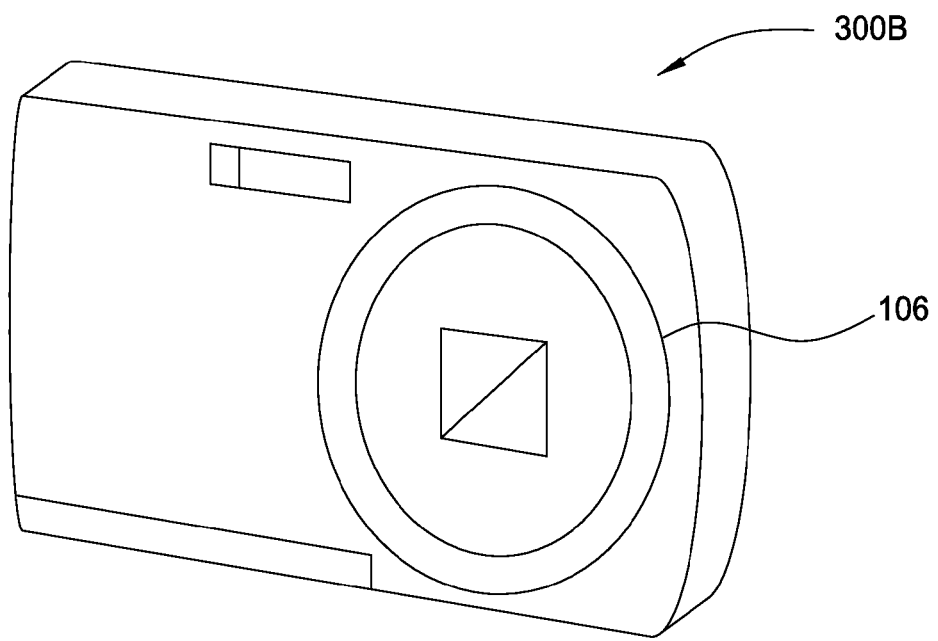
Figure 3C:
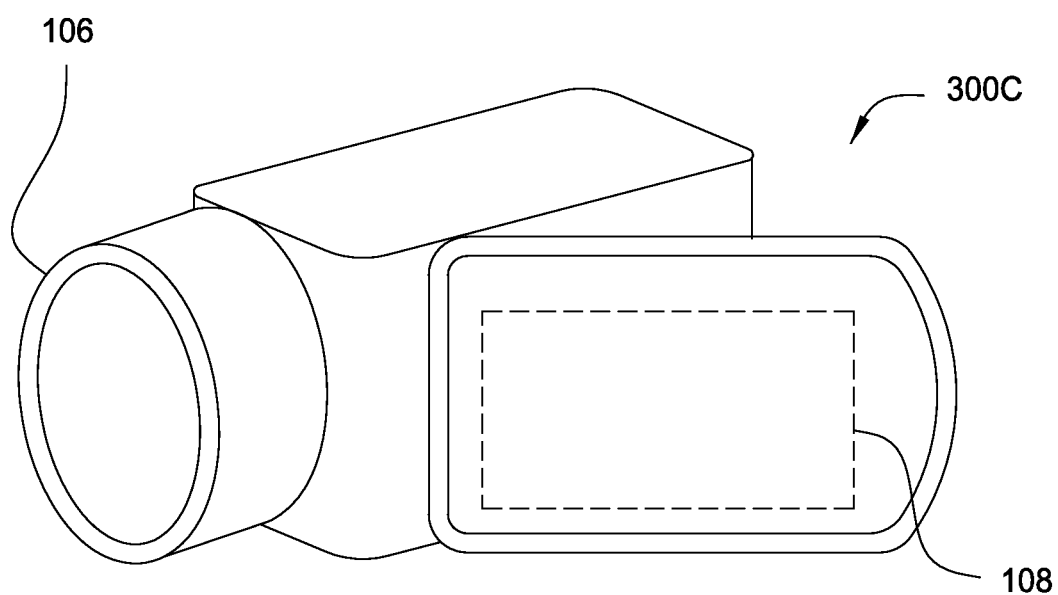

FIGS. 3A-3C illustrate exemplary systems for practicing embodiments of the invention. FIG. 3A illustrates a system 300A, such as a smart phone, in which embodiments of the invention may be practiced. The system 300A optionally includes all the components of the system 100 discussed with reference to FIG. 1, for example, a display 108 and a camera 106. The system 300A may be utilized to pre-record video as described herein.

FIG. 3B illustrates a system 300B, such as a digital camera, in which embodiments of the invention may be practiced. The system 300B optionally includes all the components of the system 100 discussed with reference to FIG. 1, such as a camera 106. The system 300B may be utilized to pre-record video as described herein.

FIG. 3C illustrates a system 300C, such as a video camera or camcorder, in which embodiments of the invention may be practiced. The system 300B optionally includes all the components of the system 100 discussed with reference to FIG. 1, such as a camera 106 and a display 108. The system 300C may be utilized to pre-record video as described herein.

Benefits of the present invention include capturing video data prior to the initiation of a record command by a system user. Thus, the system can capture video data which would not otherwise be recorded while the user navigates software or software menus on the system required to select the record command. Thus, the likelihood of missing an opportunity to record a desired event is reduced. Additionally, a user does not need to record long videos waiting for certain events to occur. Rather, with a camera direct towards the object or event, the user may simply initiate a record command after the event has begun, or in some cases completed, relying on the brief pre-recorded video to have captured the desired event.

While the foregoing is directed to embodiments of the present invention, other and further embodiments of the invention may be devised without departing from the basic scope thereof, and the scope thereof is determined by the claims that follow.

We claim:

1. A method of pre-recording a video, comprising:
receiving input in a software application selecting a first time interval of video based upon a predetermined time or file size;
receiving input in the software application selecting a second time interval of video different than the first time interval of video;
recording a first video file corresponding to the first time interval of video and saving the first video file to a data storage;
recording a second video file corresponding to the second time interval of video simultaneously with the recording a first video file and saving the second video file to the data storage;
determining, at an end of the first time interval of video, whether a record instruction has been received;
determining, at an end of the second time interval of video, whether the record instruction has been received;
determining, at any point during the first time interval of video, whether the record instruction has been received;
determining, at any point during the second time interval of video, whether the record instruction has been received;
in response to receiving the record instruction in either the first time interval of video or the second time interval of video, recording a third time interval of video and saving a third video file corresponding to the third time interval of video to the data storage; and
receiving input appending the third video file to the first video file or the second video file.

2. The method of claim 1, wherein the first video file or the second video file are appended to the third video file and saved as a single file.

3. The method of claim 1, wherein the first video file and the second video file are saved as separate files from the third video file.

4. The method of claim 3, further comprising appending the third video file to either of the first video file or the second video file.

5. The method of claim 4, wherein the third video file is appended to the second video file in response to scrubbing the second video file.

6. The method of claim 4, wherein the third video file is appended to the first video file in response to scrubbing the second video file.

7. A non-transitory computer readable medium having a sequence of instructions for pre-recording a video, which when executed by a processing unit of a system, causes the system to:
receive input in a software application selecting a first time interval of video based upon a predetermined time or file size;
receive input in the software application selecting a second time interval of video different than the first time interval of video;
record a first video file corresponding to the first time interval of video and save the first video file to a data storage;
record a second video file corresponding to the second time interval of video simultaneously with the recording a first video file and save the second video file to the data storage;
determine, at an end of the first time interval of video, whether a record instruction has been received;
determine, at an end of the second time interval of video, whether the record instruction has been received;
determine, at any point during the first time interval of video, whether the record instruction has been received;

determine, at any point during the second time interval of video, whether the record instruction has been received;

in response to receiving the record instruction in either the first time interval of video or the second time interval of video, record a third time interval of video and save a third video file corresponding to the third time interval of video to the data storage; and receive input appending the third video file to the first video file or the second video file.

8. The non-transitory computer readable medium of claim 7, wherein the first video file or the second video file are appended to the third video file and saved as a single file.

9. The non-transitory computer readable medium of claim 7, wherein the first video file and the second video file are saved as separate files from the third video file.

10. The non-transitory computer readable medium of claim 9, further comprising appending the third video file to either of the first video file or the second video file.

11. The non-transitory computer readable medium of claim 10, wherein the third video file is appended to the second video file in response to scrubbing the second video file.

12. The non-transitory computer readable medium of claim 10, wherein the third video file is appended to the first video file in response to scrubbing the first video file.

13. A system, comprising:
a camera;
a processing unit;
a non-transitory computer readable medium having a sequence of instructions for pre-recording a video, which when executed by the processing unit causes the system to:
receive input in a software application selecting a first time interval of video based upon a predetermined time or file size;
receive input in the software application selecting a second time interval of video different than the first time interval of video;
record a first video file corresponding to the first time interval of video and save the first video file to a data storage;
record a second video file corresponding to the second time interval of video simultaneously with the recording a first video file and save the second video file to the data storage;
determine, at an end of the first time interval of video, whether a record instruction has been received;
determine, at an end of the second time interval of video, whether the record instruction has been received;
determine, at any point during the first time interval of video, whether the record instruction has been received;
determine, at any point during the second time interval of video, whether the record instruction has been received;
in response to receiving the record instruction in either the first time interval of video or the second time interval of video, record a third time interval of video and save a third video file corresponding to the third time interval of video to the data storage; and
receive input appending the third video file to the first video file or the second video file.

14. The system of claim 13, wherein the system is a smart phone.

15. The system of claim 13, wherein the system is a digital camera.

16. The system of claim 13, wherein the system is a video recorder.

17. The system of claim 13, wherein the first video file or the second video file are appended to the third video file and saved as a single file.

18. The system of claim 13, wherein the first video file and the second video file are saved as separate files from the third video file.

19. The system of claim 18, further comprising appending the third video file to either of the first video file or the second video file.

20. The system of claim 19, wherein the second time interval of video is greater than the first time interval of video.

* * * * *